(12) United States Patent
Tiphane et al.

(10) Patent No.: US 7,916,120 B2
(45) Date of Patent: *Mar. 29, 2011

(54) HYBRID PRESENTATION CONTROLLER AND COMPUTER INPUT DEVICE

(75) Inventors: Guy Tiphane, Atherton, CA (US); Jan Edbrooke, Cupertino, CA (US); Laurent Plancherel, Lausanne (CH); Florian Max Kehlstadt, Aclens (CH)

(73) Assignee: Logitech Europe S.A., Morges (CH)

( * ) Notice: Subject to any disclaimer, the term of this patent is extended or adjusted under 35 U.S.C. 154(b) by 879 days.

This patent is subject to a terminal disclaimer.

(21) Appl. No.: 11/416,828

(22) Filed: May 2, 2006

(65) Prior Publication Data

US 2006/0197744 A1    Sep. 7, 2006

Related U.S. Application Data

(63) Continuation of application No. 10/117,436, filed on Apr. 4, 2002, now Pat. No. 7,061,468.

(60) Provisional application No. 60/283,109, filed on Apr. 10, 2001.

(51) Int. Cl.
*G09G 5/00* (2006.01)
*G09G 5/08* (2006.01)
*G06F 3/033* (2006.01)

(52) U.S. Cl. ........................ 345/156; 345/163

(58) Field of Classification Search .......... 345/156–158, 345/163–166

See application file for complete search history.

(56) References Cited

U.S. PATENT DOCUMENTS

| 4,521,772 | A |   | 6/1985  | Lyon |
|-----------|---|---|---------|------|
| 4,521,773 | A |   | 6/1985  | Lyon |
| 4,794,384 | A |   | 12/1988 | Jackson |
| 4,799,055 | A |   | 1/1989  | Nestler et al. |
| 5,288,993 | A |   | 2/1994  | Bidiville et al. |
| 5,420,943 | A |   | 5/1995  | Mak |
| 5,436,639 | A | * | 7/1995  | Arai et al. .................. 345/156 |
| 5,453,758 | A |   | 9/1995  | Sato |
| 5,457,478 | A |   | 10/1995 | Frank |
| 5,481,265 | A |   | 1/1996  | Russell |
| 5,578,817 | A |   | 11/1996 | Bidiville et al. |
| 5,617,304 | A |   | 4/1997  | Huang |

(Continued)

FOREIGN PATENT DOCUMENTS

DE    29823417 U1    6/1999

(Continued)

OTHER PUBLICATIONS

Agilent Technologies, "Solid-State Optical Mouse Sensor with PS/2 and Quadrature Outputs," Technical Data, May 2000, 10 pages.

(Continued)

*Primary Examiner* — Alexander S. Beck

(74) *Attorney, Agent, or Firm* — Kilpatrick Townsend & Stockton LLP

(57) ABSTRACT

An input device having a housing; a pointing device coupled with the housing having a plurality of buttons; a scrolling element coupled with the housing; and a module for detecting user input for operating the input device in at least a first mode and a second mode, where in the first mode, the input device operates as a tabletop computer pointing device, and where in the second mode, the input device operates as a hand-held presentation device used to control a computer-based presentation.

22 Claims, 2 Drawing Sheets

U.S. PATENT DOCUMENTS

| | | | |
|---|---|---|---|
| 5,663,828 A | 9/1997 | Knowles et al. | |
| 5,680,157 A | 10/1997 | Bidiville et al. | |
| 5,690,418 A | 11/1997 | Hsiung | |
| 5,697,700 A | 12/1997 | Huang | |
| 5,703,356 A | 12/1997 | Bidiville et al. | |
| 5,729,009 A | 3/1998 | Dandliker et al. | |
| 5,786,804 A | 7/1998 | Gordon | |
| 5,791,766 A | 8/1998 | Lee | |
| 5,793,032 A | 8/1998 | Bard et al. | |
| 5,803,582 A | 9/1998 | Huang | |
| 5,838,639 A | 11/1998 | Hwang | |
| 5,854,482 A | 12/1998 | Bidiville et al. | |
| 5,854,621 A | 12/1998 | Junod et al. | |
| 5,872,559 A * | 2/1999 | Shieh | 345/157 |
| 5,881,366 A | 3/1999 | Bodenmann et al. | |
| 5,882,106 A | 3/1999 | Galli | |
| 5,907,152 A | 5/1999 | Dandliker et al. | |
| 5,952,997 A | 9/1999 | Hu | |
| 5,988,832 A | 11/1999 | Chen | |
| 5,993,026 A | 11/1999 | Wu | |
| 5,994,710 A | 11/1999 | Knee et al. | |
| 5,999,166 A * | 12/1999 | Rangan | 345/157 |
| 6,002,427 A | 12/1999 | Kipust | |
| 6,012,229 A | 1/2000 | Shiao | |
| 6,014,132 A | 1/2000 | Shimada et al. | |
| 6,022,126 A | 2/2000 | Sekine et al. | |
| 6,057,540 A | 5/2000 | Gordon et al. | |
| 6,070,992 A | 6/2000 | Schnell | |
| 6,081,261 A | 6/2000 | Wolff et al. | |
| 6,084,574 A | 7/2000 | Bidiville | |
| 6,097,371 A | 8/2000 | Siddiqui et al. | |
| 6,132,064 A | 10/2000 | Bear | |
| 6,133,907 A | 10/2000 | Liu | |
| 6,145,746 A | 11/2000 | Bard et al. | |
| 6,151,015 A | 11/2000 | Badyal et al. | |
| 6,157,591 A | 12/2000 | Krantz | |
| 6,175,357 B1 | 1/2001 | Gordon | |
| 6,181,329 B1 | 1/2001 | Stork et al. | |
| 6,195,093 B1 | 2/2001 | Nelson et al. | |
| 6,281,882 B1 | 8/2001 | Gordon et al. | |
| 6,342,878 B1 | 1/2002 | Chevassus et al. | |
| 6,414,700 B1 | 7/2002 | Kurtenbach et al. | |
| 6,417,840 B1 | 7/2002 | Daniels | |
| 6,424,335 B1 | 7/2002 | Kim et al. | |
| 6,515,651 B1 | 2/2003 | Berstis | |
| 6,525,306 B1 | 2/2003 | Bohn | |
| 6,532,152 B1 | 3/2003 | White et al. | |
| 6,545,643 B1 | 4/2003 | Sward et al. | |
| 6,587,093 B1 * | 7/2003 | Shaw et al. | 345/163 |
| 7,061,468 B2 * | 6/2006 | Tiphane et al. | 345/158 |

FOREIGN PATENT DOCUMENTS

| | | |
|---|---|---|
| EP | 0798659 A1 | 1/1997 |
| JP | 10-171596 A | 6/1998 |
| JP | 10-171597 A | 6/1998 |
| WO | WO 91/07826 A1 | 5/1991 |
| WO | WO 97/41502 A1 | 11/1997 |
| WO | WO 98/37379 A1 | 8/1998 |
| WO | WO 99/39304 A1 | 8/1999 |
| WO | WO 00/33245 A1 | 6/2000 |
| WO | WO 00/38103 A1 | 6/2000 |
| WO | WO 02/11058 A2 | 2/2002 |

OTHER PUBLICATIONS

FreePen.RTM. On-line [online]. Kanitech, 1999 [retrieved on Oct. 29, 1999] 3 pages, retrieved from the Internet: <URL: www.freepen.com/index2.htm>.

FreePen Cordless Computer Mouse User Manual, Kanitech A/S, pp. 4-14, 1999.

GyroMouse Pro [online]. Diamond Multimedia Systems, Inc., 1998/1999 [retrieved on Oct. 29, 1999], 2 pages, retrieved from the Internet: <URL: www.diamondmm.com/products/current/gyromouse.cfm>.

Hinckley et al., "Touch-Sensing Input Deveices," Microsoft Research (To appear in ACM CHI'99 Conf. On Human Factors in Computing Systems), 1999, 8 pages.

Interactive RF Remote Control for Presentations—User's Guide, 20 pages, version 1.6, 1998, and data sheet, 1999, Interlink Electronics, Inc., Camarillo, CA, USA.

Logitech TrackMan Live, [online], [retrieved on Dec. 5, 2002], 3 pages, retrieved from the Internet: <URL: http://www.001abc.com/mouse/Logitech_trackman_live.html>.

Logitech TrackMan Live! Cordless Presentation, Copyright .COPYRGT. 2001 Sys-Con Publications, [Retrieved on Apr. 6, 2001] 1 page, retrieved from the Internet <URL:www.jdjstore.com/logtraclivco.html>.

Networking for All, Marco Pozzoni; Apr. 4, 2001; [retrieved on Apr. 6, 2001] 1 page, retrieved from the Internet: <URL:www.cimpa.org/.sub.--chat1/000000f0.htm>.

TrackMan.RTM. Live!.TM.; [retrieved on Apr. 6, 2001]. 1 page; Retrieved from the Internet: <URL:www.Logitech.com/cf/products/productfeatures.cfm/14>.

Non-Final Office Action for U.S. Appl. No. 10/117,436 mailed on Jun. 3, 2004; 15 pages.

Final Office Action for U.S. Appl. No. 10/117,436 mailed on Jan. 19, 2005; 12 pages.

Notice of Allowance for U.S. Appl. No. 10/117,436 mailed on Jan. 13, 2006; 7 pages.

* cited by examiner

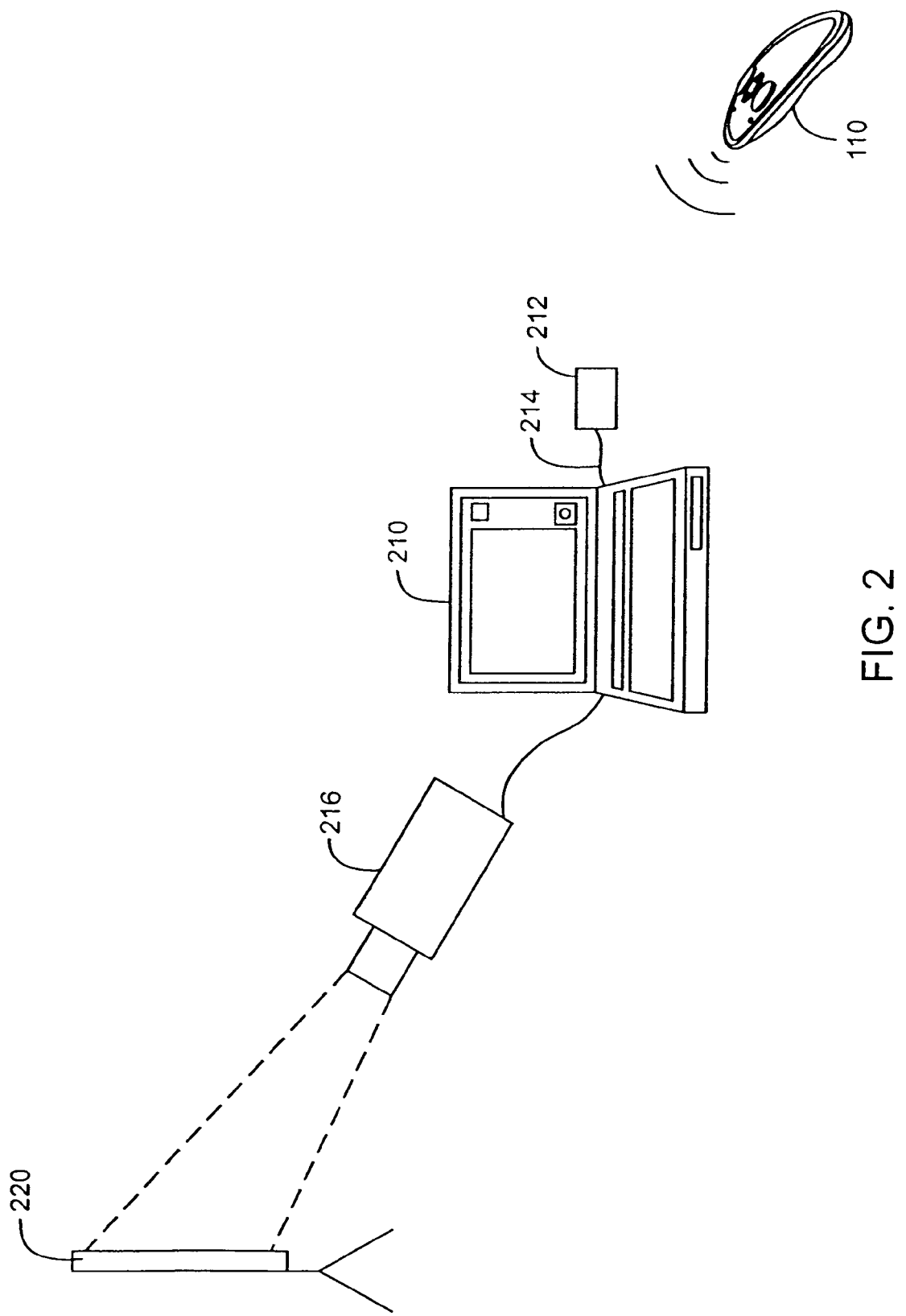

HYBRID PRESENTATION CONTROLLER AND COMPUTER INPUT DEVICE

CROSS-REFERENCE TO RELATED APPLICATION

This application claims priority to U.S. patent application Ser. No. 10/117,436, titled "HYBRID PRESENTATION CONTROLLER AND COMPUTER INPUT DEVICE," filed Apr. 4, 2002, which claims the benefit of U.S. Provisional Application No. 60/283,109, filed Apr. 10, 2001, the disclosures of which are incorporated by reference in their entirety for all purposes.

BACKGROUND OF THE INVENTION

The present invention relates to computer input devices, and in particular to computer input devices used for controlling a computer-based presentation.

The use of desktop and portable or notebook computers is steadily on the rise, and along with this rise there is also a rise in the use of such computers for the preparation and presentation of computer-based presentations. Furthermore, along with the increase in the use of computers, there has also been an increase in the use of input devices, such as computer mice, trackballs, and other pointing devices, including joysticks, gamepads, etc. These various computer input devices greatly enhance the operator's usability of the computer beyond that of a user having only a keyboard.

On another front, the use of various projection-based presentation devices has also been on the rise. Such devices when interfaced with a computer, enable a user to project his or her computer-based presentation onto, for example, a large screen for viewing by an audience. The problem is that the computer-based presentation is driven from the computer and the person presenting needs to have access to his or her computer to maneuver through the computer-based presentation. However, the person presenting does not wish to hinder the effectiveness of the presentation by not being in front of his or her audience when making the presentation. A presenter generally wishes to, or needs to be in front of his or her audience while making the presentation, and does not want to be back near his or her computer to control the presentation by using the computer's input device. Furthermore, most presentations to a large audience are conducted in a low light condition, such as in a room with the lights turned down. So besides being required to be near the computer input device, and thus practically invisible to his or her audience, the person presenting will have to maneuver the computer input device in the dark.

To address this problem, some projection-based presentation device manufacturers offer a presentation controller that if properly interfaced with a computer would allow an operator to control the computer-based presentation by using the presentation controller. Suffice it to say that establishing such a proper interface between the presentation controller and the computer is no less than a Herculean task. Furthermore, most presentation controllers use very non-intuitive and confusing interfaces that only complicate their cumbersome and unruly assortment of buttons and switches.

There is therefore an unmet need for a convenient presentation controller that also is able to function as a computer input device.

BRIEF SUMMARY OF THE INVENTION

The present invention provides an input device having a housing; a pointing device coupled with the housing having a plurality of buttons; a scrolling element coupled with the housing; and a module for detecting user input for operating the input device in at least a first mode and a second mode, where in the first mode, the input device operates as a tabletop computer pointing device, and where in the second mode, the input device operates as a hand-held presentation device used to control a computer-based presentation.

In certain embodiments, the pointing device is a computer mouse and the scrolling element is a wheel, a force-sensitive roller, a solid state roller, a trackball, a mini joystick, a touchpad, or combinations thereof.

In certain embodiments, the input device while in the second or presentation mode uses one of the plurality of buttons to move the computer-based presentation in one direction, and another of the plurality of buttons to move the computer-based presentation in another direction. For example, the left button is used to move one slide forward and the right button is used to move one slide backward in a computer-based presentation.

In one embodiment, the module for detecting user input for operating the input device in at least a first mode and a second mode includes a three-way switch coupled with the housing, wherein a first activation of the switch places the input device in the first mode, a second activation of the switch places the input device in the second mode, and a third activation of the switch turns the input device off.

In an embodiment, the module for detecting user input for operating the input device in at least a first mode and a second mode includes a software driver configured to recognize a switch between the first mode and the second mode, and treat user inputs initiated in the first mode and the second mode for processing by a computer which is connected with the computer input device.

In some embodiments, the input device is a wireless device that communicates with a host computer via a wireless receiver that is connected with the host computer via a communication bus.

In another aspect, the input device also includes a laser pointing device that is coupled with the housing.

For further understanding of the nature and advantages of the present invention, reference should be made to the following description taken in conjunction with the accompanying drawings.

BRIEF DESCRIPTION OF THE DRAWINGS

FIG. 2 is a diagram of an embodiment of the hybrid presentation controller and computer input device of the present invention connected with a computer.

DETAILED DESCRIPTION OF THE INVENTION

Embodiments of the present invention combine features of an input device or a pointing device (e.g. a computer mouse) with a presentation controller. As used herein, a presentation controller is an interaction device that is used to control a computer-based presentation (e.g., a device used to control an application program such as Microsoft PowerPoint™). Such a computer-based presentation is typically provided during a technical conference or a marketing seminar. Further, as used herein, a computer mouse according to embodiments of the present invention includes a multi-button computer mouse having a scrolling element. The scrolling element includes a wheel, a trackball, pressure sensitive switches or solid state rollers that are configured to enable a scrolling function. The scrolling element in such a computer mouse typically combines the operations which are normally carried out by a middle button of a three button mouse (i.e. by being clickable) with the operations that are well-suited to the scrolling function of a mouse-wheel, as is known in the art.

Preferably, the hybrid device of the present invention operates in at least two modes. In a first or mouse mode, or tabletop mode, the device functions as a usual computer input device (e.g. a computer mouse), which is placed on a flat surface to input position-based information to a host computer.

In a second or presentation mode, or a hand-held mode the device is lifted from the tabletop and carried by its operator to control a computer-based presentation by clicking any of the device's buttons to move forward or backward in the electronic slide presentation.

Figure 1A:
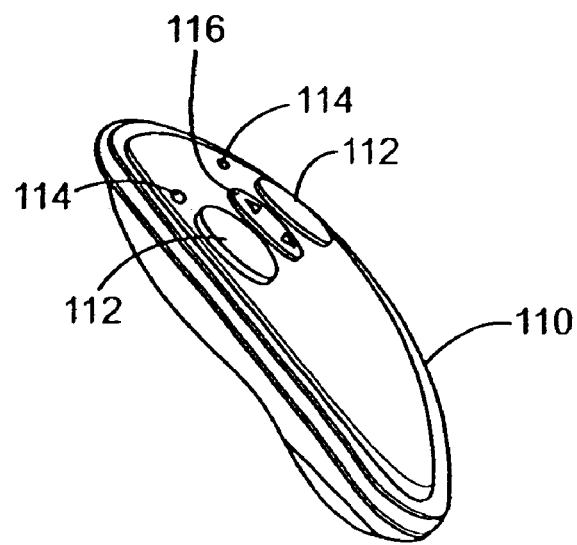
FIG. 1A is a top perspective view of one embodiment of the hybrid presentation controller and computer input device of the present invention.

FIG. 1A shows an embodiment of the hybrid presentation controller and computer input device 110 of the present invention. The device 110 has two buttons 112. One button, for example, the left button operates as "forward" and the other, for example, the right one operates as "backward" while in a computer-based presentation (e.g. Microsoft PowerPoint™), when the device is in the presentation mode. For example, the clicking of one of the buttons is configured to advance the presentation forward by one slide frame, while the clicking of another mouse button is configured to move the presentation one slide frame backward, in the same way that using the "page down" and "page up" buttons on a computer keyboard cause a forward and a backward movement within an electronic slide document.

In the mouse mode, the buttons act as they do in a typical mouse, where the left button acts as the "click/select" button and the right button acts as the "alt select" button. In both the mouse and the presentation mode the button functionality is changeable via a device setup software program that may be installed on a computer during the initial installation of the device.

The device 110 also has a scrolling element 116. Various embodiments of the scrolling element 116, include a trackball, mini joystick, a touchpad, a wheel, a solid state roller ("SSR"), or a force sensitive resistor. The functionality of the force-sensitive resistor that is implemented in a pointing device is described in a co-pending U.S. patent application Ser. No. 10/010,072, entitled: "Pointing Device with Force-Sensitive Resistor," assigned to the assignee herein, the disclosure of which is incorporated herein by reference in its entirety. In an embodiment that includes a solid state roller (SSR), scrolling is achieved by placement of a finger on metallic sensor(s), one pair at the front of the SSR to indicate a "scroll up" and one pair at the rear of the SSR to indicate "scroll down." One press of the SSR is equivalent to a "roller ratchet" and the continuous pressing of the SSR is equivalent to a "continuous scroll." The scrolling element 114 is placed on the top side of the device 110 to allow a user to have scroll capabilities in the mouse as well as the presentation modes.

Figure 1B:
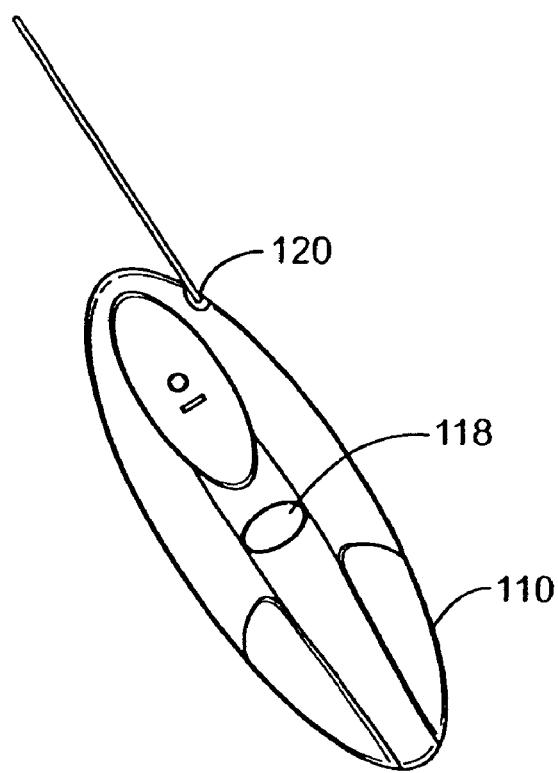
FIG. 1B is a bottom perspective view of the hybrid presentation controller and computer input device of FIG. 1A.

Alternate embodiments of the device 110 include a laser pointer 120 that is coupled with the device 110, as is shown in FIG. 1B. The laser pointer 120 may be configured to be activated in response to a mouse button click. Moreover, the laser pointer 120 may only be activatable when the device 120 is being operated in its hand-held or presentation mode. Laser pointers have become more popular as pointing devices, and some have even combined laser pointers with other devices such as watches, pens, range finders and firearm targeting devices. The incorporation of a laser pointer with a presentation controller adds convenience in that the laser pointer has utility during a presentation, since the operator can use such a presentation controller to control the presentation and use the laser pointer to point to sections of relevant screens, without needing to carry both a presentation controller and a laser pointer device. Further, a laser pointer that is coupled with a presentation device as is done in embodiments of the present invention, is easily actuated by a button click of the device 110. The button used to activate the laser pointer 120 is any of the multiple mouse buttons 112. Alternately a dedicated button is used on the device 110 for the actuation of the laser pointer 120.

A three position on/off switch 118 shown in FIG. 1B, is placed on the underside of the device 110 to turn the device on and use it in either the presentation mode or the mouse mode. In one embodiment, a first activation of the button 118 turns the device on and places it in the mouse mode; a second button activation places the device in the presentation mode; and a third activation turns the device 110 off. In an embodiment, when the device is in the presentation mode, the laser pointer 120 is enabled, and when the device is in a mouse mode, the laser pointer is disabled.

Certain embodiments of the device 110 include status LEDs 114, such as, for example, two red/green colored LEDs that are visible via windows in the top cover of the device 110, in front of buttons 112. In a wireless device embodiment, the LEDs indicate battery power level and wireless connectivity. For battery power level, in an embodiment, the green light will shine for, for example, 5 seconds when the device is switched on and then go off, when the battery level is good. If the battery level gets low (e.g. less than 50 hours or 20% of typical usage left), the LED will flash red, at a rate of, for example, once per 10 seconds. Then, if the battery is exceptionally low (e.g. less than 5% of usage left), the LED will remain a constant red. If during use, the battery level goes from an acceptable level to a low level, the LED starts to flash red at rate of, for example, once every 5 seconds to warn the user that the battery is low.

For wireless connectivity, the connectivity LED flashes, for example, once every second until the connection is made and then the green LED is on for, for example, 5 seconds, and then off. If the user starts to move out of the range of the device's receiver, the LED flashes, for example, red once a second until the user moves back in range. While connectivity is maintained, the connectivity LED flashes, for example, green every 30 seconds and when the user hits any of the buttons. A recessed connect button is placed on the bottom-side of the device 110 to enable the connection of a device 110 to its receiver, at least for the very first time the device is used.

Alternately, in addition to the switching between the two modes using the three-way on/off switch 118, the switching is enabled automatically. An automatic switching from a first mode (e.g. pointing device mode) to a second mode (e.g. presentation mode) occurs when the device is lifted from the tabletop. The device is configured to recognize that it has been lifted from the tabletop using mechanical means for a mechanical (e.g. a ball-type mouse) mouse. Alternately, the device 110 is configured to recognize that it has been lifted from the tabletop using optical means for an optical mouse. Mechanical means, for example, include a switch that is biased against the top of the ball, and is configured to detect when the ball drops lower, for example, as in when the mouse is lifted from the table-top. Optical means, for example, include using optical detectors to sense a change in the intensity of the detected light to indicate that very little reflected light is hitting the optical detector, as in, for example, when the optical mouse is lifted from the tabletop. Furthermore, the optical detector is configured to detect the difference between a fast change in light intensity, as in when the mouse is lifted from the table-top from the more gradual case, where the battery power level has been depleted. The optical mouse embodiment houses an Agilent optical module, including an Agilent optical sensor.

Alternately, a manual switching between a tabletop mode and a handheld mode is achieved by indicating to the device through a software program, which invokes a setup program, to recognize button and scroll functions corresponding to either a tabletop computer mouse mode or a handheld presentation device mode.

Furthermore, in addition to the manual switching and the automatic switching between the table top and handheld modes, as described above, a module for detecting user input for operating the input device in the first mode (e.g. tabletop) and a second mode (e.g. handheld) includes a software driver configured to recognize a switch between the first mode and the second mode, and treat user inputs initiated in the first mode and the second mode for processing by a computer which is connected with the computer input device.

For example, when the device 110 is in its presentation mode, button clicks are configured to advance a slide forward or backward in a computer-based presentation. Further, the scroll element on the device is configured to be used during the hand-held mode to control a presentation. The scroll element is used to control more complex operations than moving forward and backward, which may be carried out by the button clicks, as described above. For example, the scroll element may be used to select from various options while the device is held by the operator, and where it is inconvenient to revert to the first mode (e.g., by putting the device back on the tabletop). The options are selected from a preprogrammed menu, which is displayed on a presentation screen in response to the operator using the scroll element while holding the device in its hand-held mode. The preprogrammed menu is preferably a smaller menu so as not to disrupt the presentation by showing a full menu to the audience. The preprogrammed menu, which is modifiable, may be installed and configured as a part of the initial device installation procedure.

To activate the preprogrammed menu, the operator activates the scroll element to display a menu on the screen. The operator chooses a menu item from the menu by using the scroll element, and selects a menu option by clicking on it using the scroll element or one of the buttons. One example of a menu item includes volume control where it is selected by a wheel click and the sound level is adjusted up or down by turning the wheel up or down respectively. Another example of a scroll menu item includes scroll speed providing fast or slow and a range of scroll speeds. Another example includes switching to another application program by clicking on "programs" and then choosing another program with the scroll element and selecting the chosen program with another click operation. Another example includes selecting another presentation in essentially the same manner as selecting another program, as described above. Another example includes selecting "bookmarked" web sites with a scroll element click and then choosing amongst the sites with the scroll element scroll and selecting a site by another scroll element click.

These and other examples of most needed shortcuts for the device are loaded or preprogrammed into the scroll element menu before the device is used during a presentation in its hand-held mode. Having preprogrammed the scroll element menu, the operator can hold the device in his or her hand and walk around during the presentation, switching slides and/or selecting preloaded functions easily by using the scroll element of the device.

As shown in FIG. 2, the device 110 communicates with a host computer 210 (e.g., to control an electronic slide show application program) via a wired connection or alternately via a wireless connection. The host computer 210 in connected with a presentation device 216 for projecting a computer-based presentation onto a screen 220.

A wireless device 110 allows its operator the freedom to move freely beyond the range of a wired presentation device while controlling a computer-based presentation. In a wireless embodiment, the device 110 communicates with the host computer 210 via a wireless receiver 212 which is coupled to the host computer 210 via a bus 214. In an embodiment, the protocol for wireless communication between the device 110 and the host computer 210 via receiver 212 is an implementation based on the Bluetooth™ Human Interface Device (HID) profile, and thus the device 110 will be compatible with devices based on this HID protocol. While certain host computers may include a Bluetooth™ HID profile and thus not require the receiver 212, the receiver 212 serves as a bridge for host computers that do not use the Bluetooth™ HID profile using the host computer's bus, which is, for example a USB bus. Bluetooth™ is a wireless technology that offers cable replacement for personal electronic devices. As is known to those skilled in the art, other wireless communications protocols, including fixed or spread spectrum wireless communications protocols are equally useable with the wireless implementation of the device 110 and the wireless receiver 212. The wireless receiver may be implemented as an external or internal receiver device, a USB dongle, a PCI card or a PCMCIA card.

Alternately, the device is configured for operation in a combined wired and wireless mode. In such an embodiment, the device is preferably a wired device when operating in the mouse or tabletop mode, thus conserving battery power by drawing power from the computer via the bus connection to the computer. When the device is disconnected from the bus, the device switches to a wireless device. In an embodiment, the shift from a wired to a wireless device, also switches the device from its first or mouse mode, to its second (e.g. handheld) or presentation mode. This combined wired and wireless capability provides the advantages of a wireless device when operated as a presentation controller with the power saving feature of a wired device, when operated as a mouse.

Another alternate embodiment of the present invention is a device that is used purely as a presentation controller. In this embodiment the device is configured to function solely as a presentation controller and not also as computer input device. In this embodiment, a wheel is used as a scrolling element. This embodiment is readily adopted by its operator to control a computer-based presentation, owing to its similarity to a usual computer input device, such as, for example, a mouse. The operator of such a device will not need any additional training in its use, since computer input devices have become a very common peripheral device. An operator will click a button and/or the wheel and will be presented with the results of each click and thus the operator will intuitively learn to use the device. For example, the operator will click one of the buttons to see that the presentation has advanced one slide forward, and realize that the particular button is used to move forward in a presentation. Or an operator will click the wheel and will be presented with a menu on a screen, and will intuitively understand what additional clicks or scrolls of the wheel achieve. This embodiment is configured to communicate with a host computer (e.g., to control an electronic slide show application program) via a wired connection or alternately via a wireless connection. A wireless presentation device allows its operator the freedom to move freely beyond the range of a wired presentation device while controlling a computer-based presentation. Other embodiments of this purely presentation controlling device optionally include a laser pointer device as is described above.

Various features of the embodiments of the present invention provide many advantages to a user of such a hybrid presentation controller and computer input device. For example, the plurality of buttons enable the user to easily move slides forward and backward in a computer-based presentation. The dual functionality of the device meets a greatly unmet need by providing one easy to use device that allows for the control of a computer-based presentation as well providing the indispensable functionality of a computer input device, all in one device. The coupled laser pointer allows for the easy highlighting of key aspects of a presentation and alleviates the need and trouble of handling another device. Lastly, the wireless implementation of the hybrid device enables the user to freely move about as the presentation is being controlled. The wireless connectivity also avoids the hassles of having to wrestle another tangled cord.

As will be understood by those of skill in the art, the present invention may be embodied in other specific forms without departing from the essential characteristics thereof. For example, the device communicate with a host computer via a wireless or a tethered connection, or that the device may only be utilized in its hand held mode, foregoing the usual computer input device mouse operations. Accordingly, the foregoing disclosure is intended to be illustrative, but not limiting, of the scope of the invention, which is set forth in the following claims.

What is claimed is:

1. An input device, comprising:
    a housing;
    an optical source coupled to the housing and configured to emit radiation;
    an optical detector configured to detect a first rate of change of the intensity of the radiation reflected from a surface and a second rate of change of the intensity of the radiation reflected from the surface, the second rate of change being different from the first rate of change; and
    a module configured to change a mode of operation of the input device between a first mode and a second mode if the first rate of change of the intensity is detected by the optical detector, and maintain the mode of operation of the input device if the second rate of change of the intensity is detected by the optical detector.

2. The input device of claim 1, wherein:
    in the first mode, the input device operates as a pointing device, and
    in the second mode, the input device operates as a presentation device used to control a computer-based presentation.

3. The input device of claim 2, wherein in the first mode the input device operates as a mouse.

4. The input device of claim 1, further comprising:
    a plurality of buttons coupled to the housing; and
    a scrolling element coupled to the housing.

5. The input device of claim 4, wherein the scrolling element is a wheel, a force-sensitive roller, a solid state roller, a trackball, a mini joystick, or a touchpad.

6. The input device of claim 4, wherein in the second mode one of the plurality of buttons is configured to move a computer-based presentation in a first direction, and another of the plurality of buttons is configured to move the computer-based presentation in a second direction.

7. The input device of claim 4, wherein an activation of the scrolling element in the second mode is configured to initiate display of a menu on a computer screen presenting menu items configured to be selected by a subsequent scrolling element input.

8. The input device of claim 7, wherein the scrolling element is a wheel, a force-sensitive roller, or a solid state roller and wherein an item from the menu items is configured to be chosen in response to a scrolling movement of the scrolling element and a selected-menu item is configured to be selected in response to a pressing motion on the scrolling element.

9. The input device of claim 7, wherein at least one of the menu items is for changing the functionality of the buttons from a first control mode to a second control mode.

10. The input device of claim 9, wherein a given one of the menu items is associated with changing the input device from the second mode to the first mode.

11. The input device of claim 10, wherein another of the menu item is associated with changing the input device from the first mode to the second mode.

12. The input device of claim 4, further comprising a laser pointing device coupled to the housing.

13. The input device of claim 12, wherein the laser pointer is actuated by one of the plurality of buttons.

14. The input device of claim 4, wherein the scrolling element is configured to be pressed once for a single ratchet scroll and configured to be pressed in a substantially continuous manner for substantially continuous scrolling.

15. The input device of claim 14, wherein the scrolling element is a metallic sensor.

16. The input device of claim 1, further comprising a power source configured to power the optical source.

17. The input device of claim 16, wherein the second rate of change is associated with a changing rate of power supplied by the power source.

18. The input device of claim 1, wherein the first rate of change is greater than the second rate of change.

19. The input device of claim 1, wherein:
    the module includes a three-way switch coupled to the housing,
    a first activation of the switch places the input device in the first mode,
    a second activation of the switch places the input device in the second mode, and
    a third activation of the switch turns the input device off.

20. The input device of claim 1, wherein the input device is a wireless device.

21. The input device of claim 1, wherein the module is configured to detect a user input to configure the input device to operate in at least one of the first mode and the second mode.

22. The input device of claim 1, wherein the first rate of change is associated with lifting the input device from a surface or placing the input device on the surface.

* * * * *